United States Patent
Lahti et al.

(10) Patent No.: US 7,110,484 B1
(45) Date of Patent: Sep. 19, 2006

(54) METHOD AND ARRANGEMENT FOR CHANGING PARALLEL CLOCK SIGNALS IN A DIGITAL DATA TRANSMISSION

(75) Inventors: Harri Lahti, Klaukkala (FI); Marko Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/937,577

(22) PCT Filed: Mar. 31, 2000

(86) PCT No.: PCT/FI00/00279

§ 371 (c)(1),
(2), (4) Date: Mar. 8, 2002

(87) PCT Pub. No.: WO00/60801

PCT Pub. Date: Oct. 12, 2000

(30) Foreign Application Priority Data

Apr. 1, 1999 (FI) .................................. 990738

(51) Int. Cl.
*H04L 7/00* (2006.01)
*H04J 1/16* (2006.01)

(52) U.S. Cl. .................. 375/355; 375/356; 375/357; 375/358; 370/518; 370/519; 331/25

(58) Field of Classification Search ............. 375/354, 375/355, 357, 358, 359, 362, 369, 373, 376, 375/327, 356, 343, 350, 148, 150; 370/305, 370/518, 519; 331/25
See application file for complete search history.

(56) References Cited

U.S. PATENT DOCUMENTS

| 4,349,914 | A | | 9/1982 | Evans ......................... 375/40 |
| 4,451,916 | A | | 5/1984 | Casper et al. ................. 370/16 |
| 4,953,185 | A | * | 8/1990 | Goode ......................... 375/354 |
| 5,155,483 | A | | 10/1992 | Morimoto .............. 340/825.03 |
| 5,172,396 | A | | 12/1992 | Rose, Jr. et al. ............ 375/107 |
| 5,528,198 | A | * | 6/1996 | Baba et al. ................. 331/1 A |
| 5,740,211 | A | | 4/1998 | Bedrosian ................... 375/371 |
| 5,761,245 | A | | 6/1998 | Haukkavaara et al. ...... 375/267 |
| 6,211,742 | B1 | * | 4/2001 | Tan et al. ..................... 331/25 |
| 6,266,385 | B1 | * | 7/2001 | Roy et al. ................... 375/372 |
| 6,504,633 | B1 | * | 1/2003 | Hovorka et al. ........... 398/183 |
| 6,711,227 | B1 | * | 3/2004 | Kaylani et al. ............. 375/372 |
| 6,754,133 | B1 | * | 6/2004 | Morita et al. ............... 365/233 |
| 6,763,060 | B1 | * | 7/2004 | Knapp ........................ 375/219 |

* cited by examiner

*Primary Examiner*—Jean B Corrielus
*Assistant Examiner*—Qutub Ghulamali
(74) *Attorney, Agent, or Firm*—Cohen, Pontani, Lieberman & Pavane (57) ABSTRACT

A changeover arrangement for the clock signals of parallel transmission connections of an assured data transmission link, wherein a clock signal is sent for the transmission paths by parallel outdoor units (OU) located in succession to a common indoor unit (IU), the clock signal is received by a corresponding set of second outdoor units, where phase locked loop signals are used to achieve the lock to the signal, and subsequent to which a second IU receives information of the mode of the phase lock. In addition, when errors are caused in the employed connection, the receiving unit selects a transmission path that has fewer errors based on mode information obtained from the outdoor unit.

13 Claims, 8 Drawing Sheets

METHOD AND ARRANGEMENT FOR CHANGING PARALLEL CLOCK SIGNALS IN A DIGITAL DATA TRANSMISSION

CROSS-REFERENCE TO RELATED APPLICATIONS

This is a U.S. national stage of application No. PCT/FI00/00279, filed on Mar. 31, 2000. Priority is claimed on the following application Country: Finland, Application No.: 990738, Filed: Apr. 1, 1999.

BACKGROUND OF THE INVENTION

The invention relates to a method and arrangement for changing parallel clock signals in the propagation assurance of digital data transmission, particularly for realising the propagation assurance of radio links. The invention is suited to other data transmission connections as well, for instance to connections using optical transmission paths.

The quality requirements for a digital radio link are generally known; said requirements are set for example by the ITU, International Telecommunication Union. The quality requirements refer to the reliability and interference-free quality of the transmission. The most important features are usability, error ratio and phase noise. Among the factors that affect the fulfilment of said criteria are hardware malfunctions, weather and changes in the signal path. In order to fulfil the requirements, it is necessary to provide an equipment and propagation assurance for the radio link, which means the use of alternative equipment and transmission paths. By means of equipment assurance, there is obtained a more reliable usability, and by propagation assurance, there is obtained both a lower error ratio and a lower phase noise.

Figure 1:
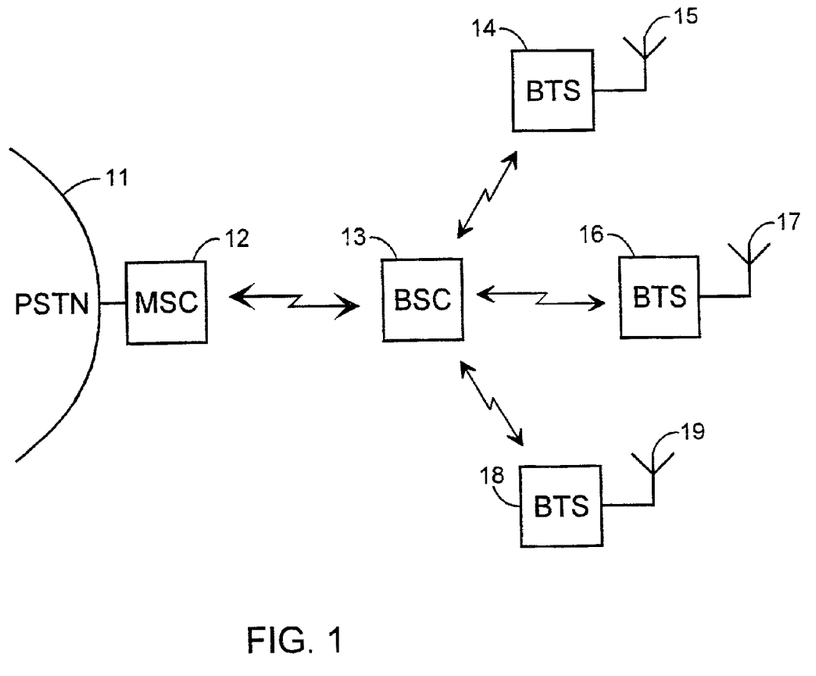
FIG. 1 is a block diagram illustrating a service environment according to the invention.

FIG. 1 is a block diagram illustrating one target of propagation assurance. A public switched telephone network (PSTN) 11 is connected by wires to a mobile switching centre (MSC) 12. The security of the radio link between the switching centre 12 and the base station controller (BSC) 13 is extremely important, wherefore it is generally assured. The controller 13 is further connected, by radio connections which can also be backed up, to base telecommunication stations (BTS) 14, 16, 18 and to their antennas 15, 17, 19.

The propagation assurance of radio links is realised by means of one or several parallel radio connections. Now in parallel with the major radio connection, there is constructed one or several other backup transmission paths that carry the same information. The transmission paths are preferably different in order to prevent possible interference caused by the terrain and/or weather changes from affecting both paths at the same time. Among the transmission paths, there is selected the one that has, in the prevailing conditions, a better signal at the station receiving the radio link. The applied criterion for the selection is generally the signal strength, but also the correctness of the parity of the received information. The changing of the transmission path is carried out by means of a specific changeover device, in a way that is as error-free as possible, by compensating both the dynamic and static phase differences caused by the propagation of the signals in different transmission paths. The block dealing with the clock signal is the most critical part in the changeover device.

Among the drawbacks with known analog arrangements for changing the clock signal are the required separate components; in order to be able to use them, there is needed space on the circuit board and they consume a remarkable amount of power.

Another drawback with known analog arrangements is their cumbersome tuning as a final step in the production.

SUMMARY OF THE INVENTION

The object of the invention is to introduce an advanced method and arrangement for changing the clock signals in parallel transmission connections of a assured data transmission link. According to the method of the invention, the receiving transmission path is changed prior to losing the phase lock, and the data transmission of the link remains error-free, in case at least one of the transmission paths transmits the clock signal as sufficiently free of errors, even if errors should occur in another path.

This is realised so that through the parallel outdoor units (OU), located in succession to the common indoor unit (IU), there is sent a clock signal to the transmission paths, said clock signal is received by a second set of outdoor units, where the signal is locked by phase locked loops, and information of the mode of the phase lock is transmitted to the second indoor unit; further, there is chosen, in the receiving indoor unit, on the basis of the information obtained from the outdoor unit, a transmission path that contains less errors, in case errors occur with the employed connection. Here also a fading of the clock signal, leading to a disconnection from the phase lock, is considered as an error.

The invention relates to a method for changing parallel clock signals in digital data transmission. According to the invention, the changing of the clock signals is requested from the changeover device by a control signal based on a signal indicating an uncertainty in the locking, obtained from the phase locked loop; then there is expected a simultaneous signal pattern "11", i.e. an identical mode in order to get the signals in the same active part of the phase, as well as a turning in the polarity of the signal phase difference, in order to obtain a situation where the signals have just recently been either in the same phase or in a phase shift of 180°, and after a delay DL, the clock signals are changed at a moment during which the clock signals in question are as near to phase coincidence as possible.

The invention relates to an indoor unit provided for digital data transmission and for changing the clock signal to be received among parallel clock signals of digital data transmission. According to the invention, the indoor unit includes an changeover device in order to receive and change a propagation assured clock signal on the basis of missing the locking.

The invention also relates to an outdoor unit provided for digital data transmission and for changing the parallel clock signals of digital data transmission. According to the invention, the outdoor unit includes a transmitter for transmitting the clock signal and respectively a receiver for receiving the clock signal, a phase lock synchronised with the received clock signal and further a signal output for indicating the mode of the synchronisation for the indoor unit.

The invention relates to an arrangement for changing parallel clock signals in digital data transmission, said arrangement comprising a first indoor unit for dividing the clock signals to be transmitted, antennas for transmitting and receiving parallel clock signals, and another indoor unit for selecting the clock signals to be received. According to the invention, it also comprises a first changeover device in the first indoor unit and a second changeover device in the second indoor unit in order to receive the propagation assured clock signal;

in the transmission paths, a first and second outdoor unit in the transmitter transmitting the clock signal, and respectively in the receiver receiving the clock signal, as well as a phase lock which is synchronised with the received clock signal.

According to the invention, the changing of the transmission path is carried out always when the reception of the clock signal deteriorates to the extent that the loop that is phase locked to the clock signal does not keep in phase.

The changeover device can be realised with a fully application specific integrated circuit (ASIC).

An advantage of the invention is a shorter mean time between failure (MTBF) owing to a smaller number of components.

Preferred embodiments of the invention are set forth in the independent claims.

BRIEF DESCRIPTION OF THE DRAWINGS

The invention is described in more detail below, with reference to the accompanying drawings, where.

DETAILED DESCRIPTION OF THE PREFERRED EMBODIMENTS

FIG. 1 was already dealt with above, in the description of the prior art.

Figure 2:
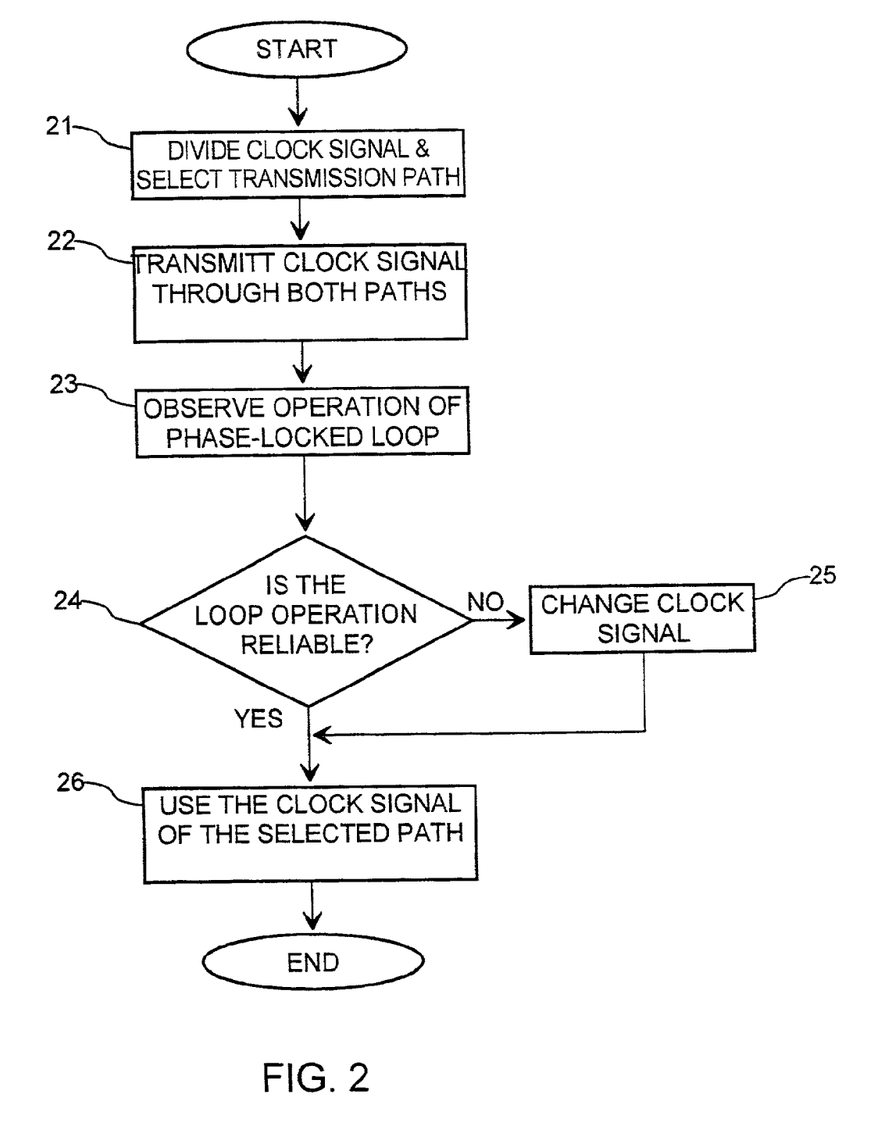
FIG. 2 is a flow diagram illustrating a method according to the invention.

The flow diagram of FIG. 2 illustrates the operation steps of a method according to the invention. The data flow to be transmitted is divided into two transmissions, and there is chosen a primary transmission path, i.e. a default path 21. The clock signal is transmitted, 22, through both transmission paths, for instance via a radio connection. When receiving the clock signals, the operational reliability of the loop that is phase locked to the clock signal is detected, 23, on both transmission paths. If the operational reliability of the phase locked loop is sufficient, the phase lock of the clock signal in the chosen transmission path is used, 26. If the operational reliability of the phase locked loop is not sufficient, 24, the chosen transmission path of the clock signal is changed, 25, by changing over to the phase lock which is locked in the clock signal of the other transmission path. However, the clock signal is transmitted through both transmission paths.

Figure 3:
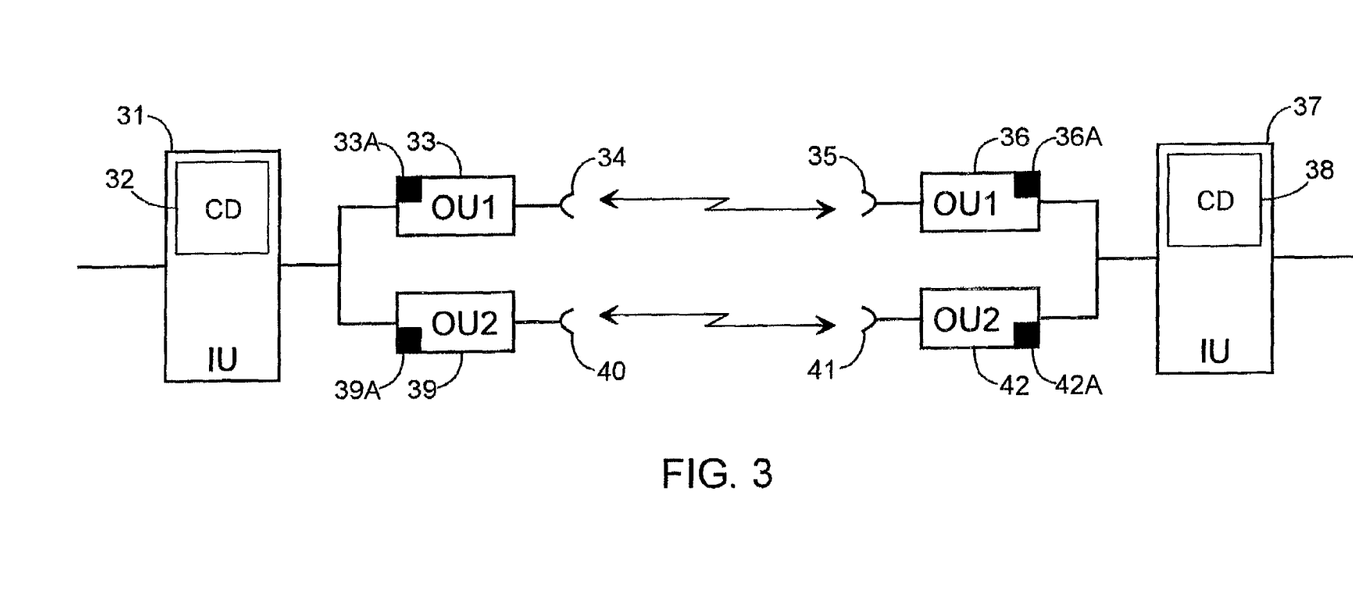
FIG. 3 is a block diagram illustrating a link arrangement according to the invention.

FIG. 3 is a block diagram illustrating the essential elements of a link arrangement according to the invention. An indoor unit (IU) 31 comprises a changeover device (CD) 32 for receiving propagation assured information. The first transmission path comprises an outdoor unit (OU) OU1 33, antennas 34, 35 and an outdoor unit OU1 36. On the right-hand side, there is shown an indoor unit IU 37 that is common for both transmission paths, and a changeover device CD 38 included in said indoor unit 37. The other transmission path comprises corresponding devices 39, 40, 41, 42. The selection of the transmission path for transmissions from left to right is carried out by the changeover device 38, and the selection of the transmission path for transmissions from right to left is carried out by the changeover device 32. The outdoor units 33, 36, 39, 42 comprise means 33A, 36A, 39A, 42A for creating and outputting the signal that indicates the mode of the synchronisation in the clock signal reception.

Figure 4:
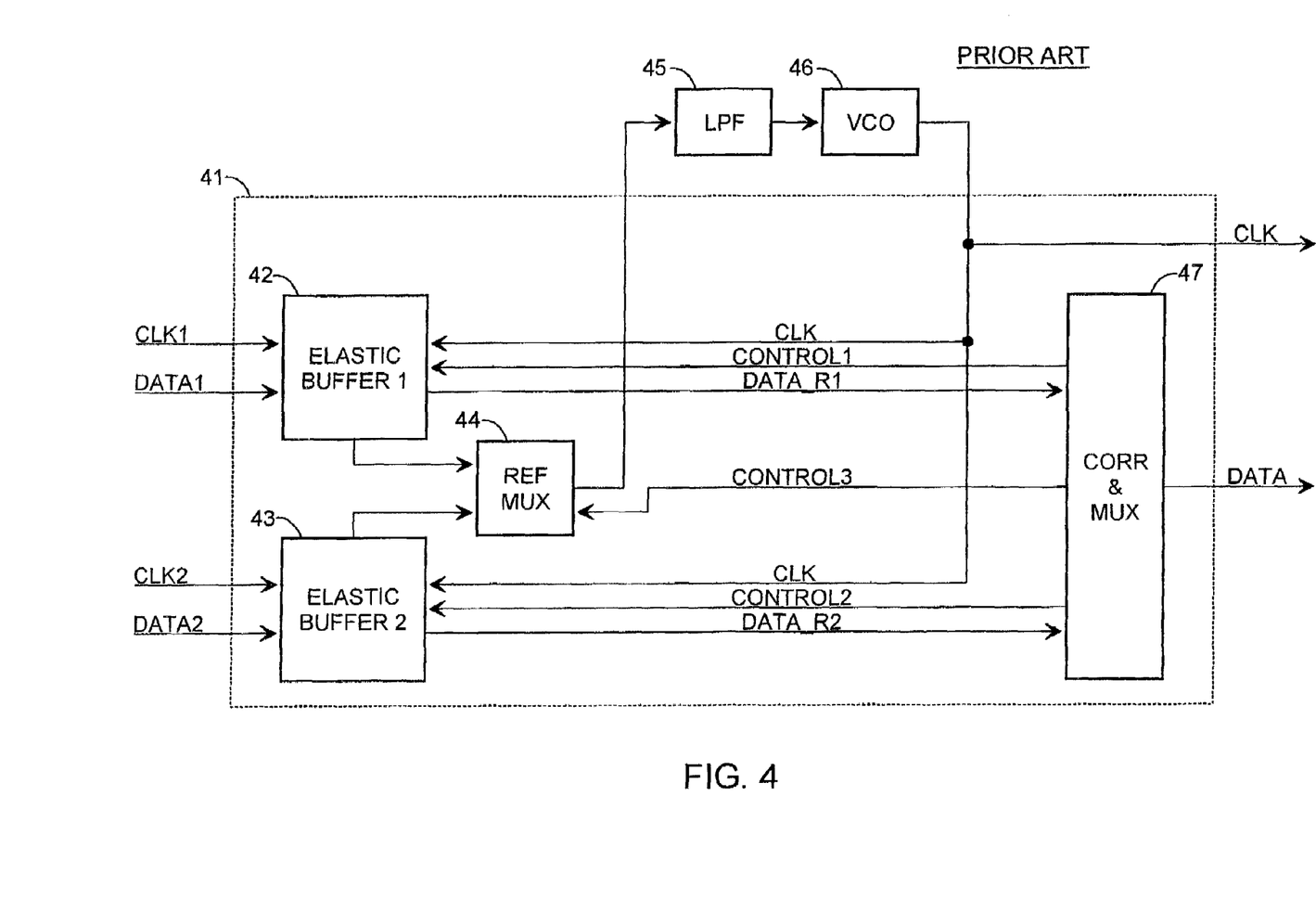
FIG. 4 is a block diagram illustrating a known signal changeover device.

FIG. 4 illustrates a prior art changeover device where the pairs of two clock signals CLK and a data signals DATA are changed. The elements outlined by the dotted line 41 are realised by an application specific integrated circuit (ASIC), and they include the following parts: an elastic buffer ELASTIC BUFFER 1 receiving the first signal pair CLK1, DATA1, an elastic buffer ELASTIC BUFFER 2 receiving the second signal pair CLK2, DATA2, a multiplexer REF MUX 44 of the reference clock signal, as well as a correlator and multiplexer CORR & MUX 47. Outside the integrated circuit, there are needed at least an analog low pass filter (LPF) 45 and a voltage controlled oscillator (VCO) 46. The difference in the write and read addresses of the active buffer 42 or 43 is conducted, via the multiplexer REF MUX 44, to the filter 45 in order to control the voltage controlled oscillator 46.

The writing to buffers is synchronised with incoming clock signals CLK1, CLK2, and the reading is synchronised by the output signal CLK of the voltage controlled oscillator 46, which signal is locked to the clock signal CLK1 or CLK2 of the active cable by the signal of the time difference between writing and reading the information, which signal is obtained from the buffer. The cable to be received is determined in the correlator 47, and there are created control signals CONTROL1, 2 for reading the buffers and a control signal CONTROL3 for controlling the multiplexer.

Figure 5:
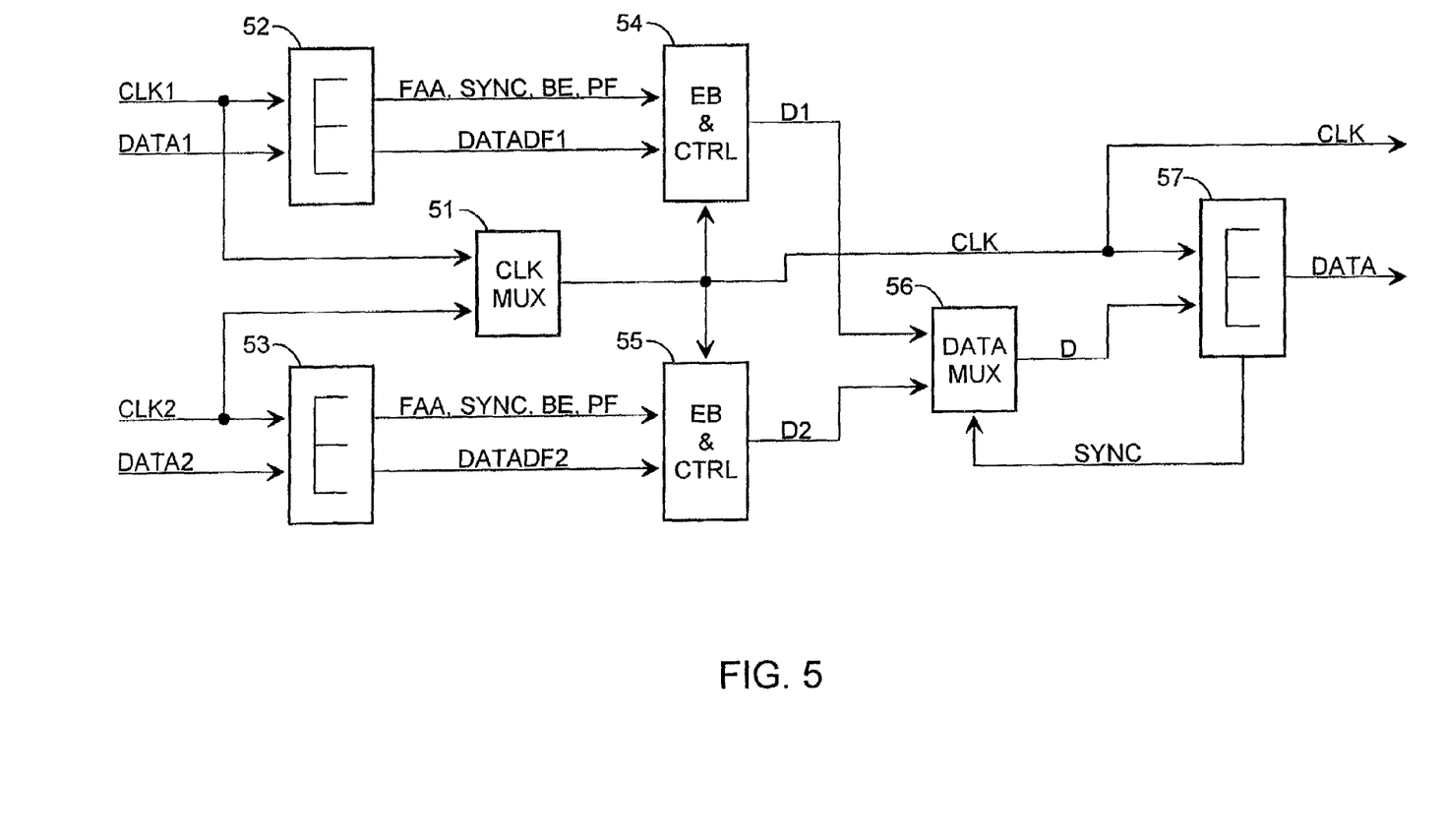
FIG. 5 is a block diagram illustrating a changeover device applying a clock signal multiplexer according to the invention.

FIG. 5 represents a block diagram of a signal changeover device according to the invention in an application specific integrated circuit. The clock signals CLK1, CLK2 of the received signal pairs are conducted to the clock signal multiplexer CLK MUX 51, where the clock signal to be received is selected. Both the clock signals CLK1, CLK2 and the data signals DATA1, 2 are also conducted to the data frame decoding blocks 52, 53, where the signals are used to create for example the following signals: synchronising signal SYNC, bit error signal (BE), frame alignment alarm signal (FAA), and pseudo frame signal (PF), as well as the data signals DATADF1, DATADF2 decoded from the frames. The outdoor unit OU activates the PF signal while loosing the locking of the clock signal CLK1, CLK2 to be received. In that case the data signal to be transmitted is replaced by a predetermined frame structure. The PF signal is used to indicate, prior to the FAA signal, an error situation in the reception of the clock signal CLK1, CLK2 in the indoor unit, and the FAA signal is only activated on the basis of several alignment errors in received frames. Owing to the pseudo frame structure, the data transmission between the outdoor unit OU and the indoor unit IU can be kept in operation even if the outdoor unit does not receive a proper clock signal. The signals are conducted to the blocks of elastic buffers EB & CTRL 54, 55, where also the selected clock signal CLK to be received is conducted in order to synchronise the data. From the blocks 54, 55, the data signals D1, D2 are conducted, by the data signal multiplexer DATA MUX 56, as a signal D to the decoding block 57. In the decoding block 57, the multiplexer 56 is controlled by the signal SYNC.

Figure 6:
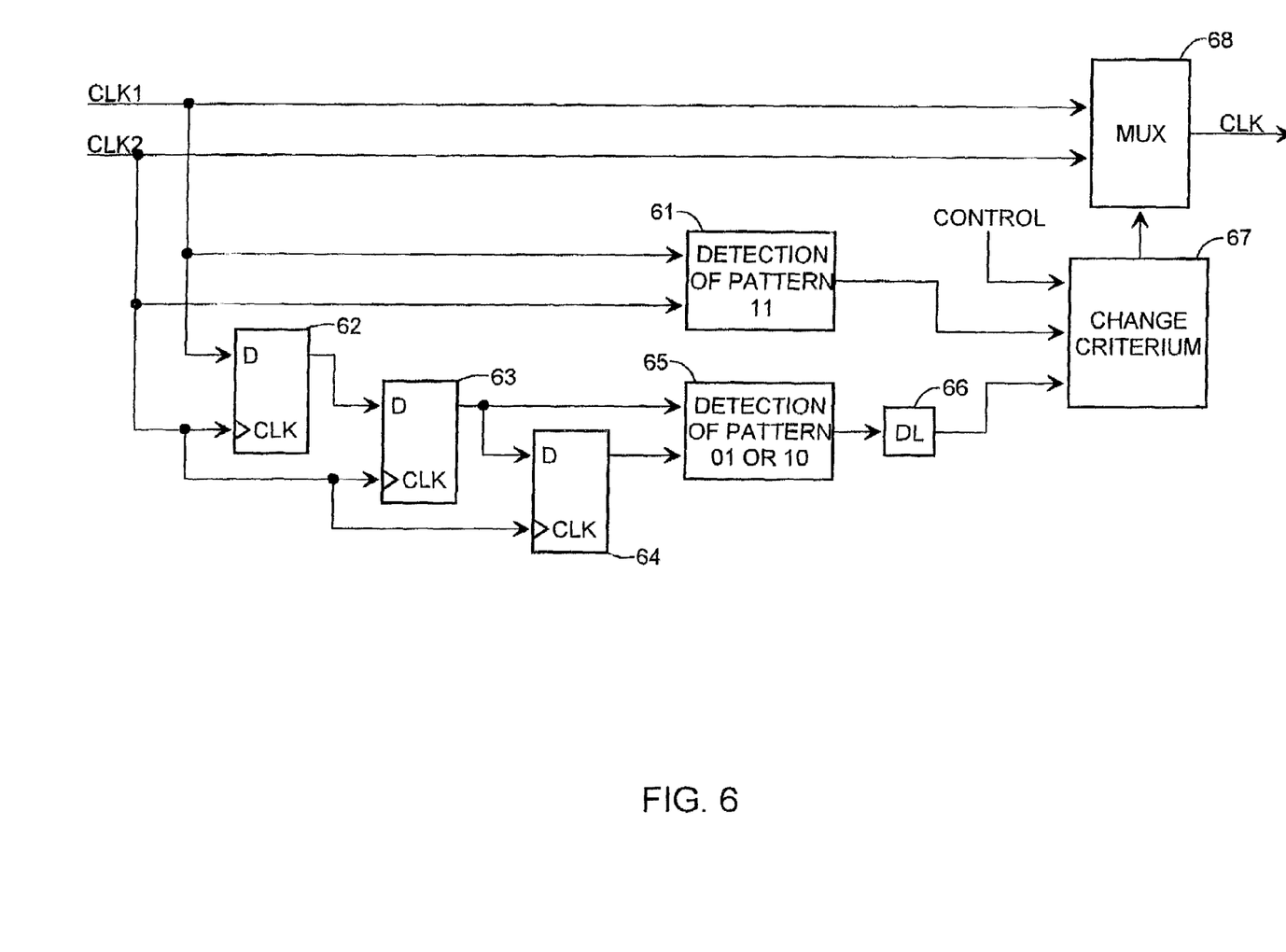
FIG. 6 is a block diagram illustrating a clock signal multiplexer according to the invention.

FIG. 6 illustrates a clock signal multiplexer according to a preferred embodiment of the invention, which multiplexer waits for a suitable clock signal phase in order to change the signals, whereafter the signals are changed. The block 61 detecting the signal pattern "11" sends an active signal when the value of both clock signals CLK1, CLK2 is one. The D-flip-flop circuits 62, 63, 64 form a phase shift sensitive coupling, the outputs whereof are conducted to the block 65 detecting the signal patterns "01" and "10". Owing to said coupling, the output of the block 65 is raised to value one after a period of one clock cycle of the clock signal CLK2 has passed from the moment when the polarity of the phase difference between the clock signals CLK1, CLK2 was changed. Thus the phase difference at the moment of a rise in the output of the block 65 is virtually non-existent or 180°. If the signals are cophasal, they can be exchanged almost without a phase shift after a short delay DL 66. The changing of the clock signals by the multiplexer 68 is controlled by the block 67 checking the criteria of the changeover operation, which block 67 receives as input signals a control signal requesting the changeover, a signal indicating the clock signal pattern "11" and a signal indicating the shift in the clock signal phase and delayed by the delay DL. On the basis of said criteria it is known that the signals are cophasal and not in a phase shift of 180°. The purpose of the delay DL is to ensure that the changing of the clock signals is carried out while the clock signals are, from the point of view of the system, in a static mode, i.e. in mode one. This prevents the creation of a disturbing voltage peak.

Figure 7:
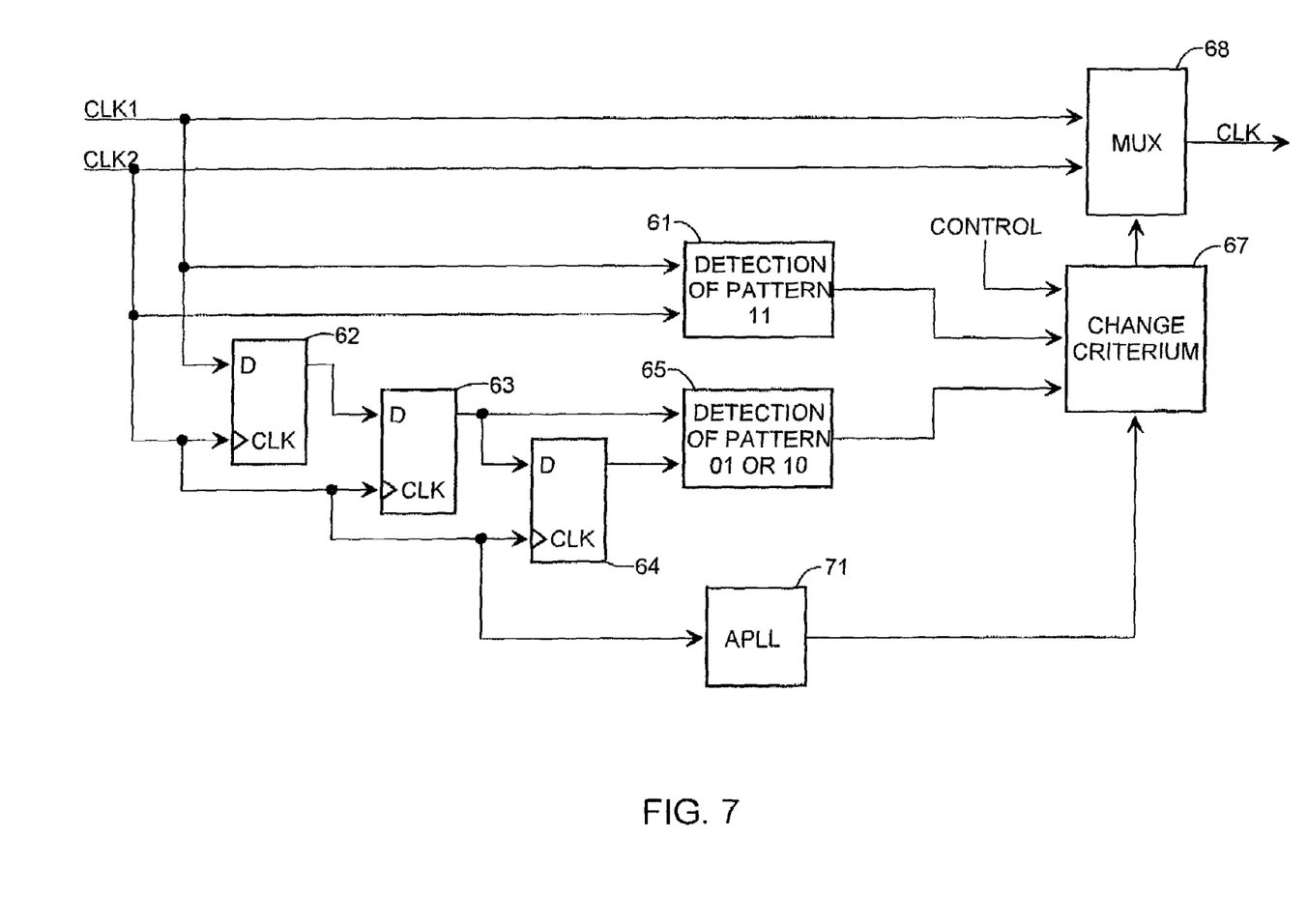
FIG. 7 is a block diagram illustrating another clock signal multiplexer according to the invention.

FIG. 7 illustrates another clock signal changeover device according to the invention, which device comprises, in addition to the embodiment illustrated in FIG. 6, an analog phase-locked loop (APLL) 71 for synchronising the change, said loop multiplying the frequency of the second clock signal CLK2 by four. The output of the loop 71 is conducted to the block 67 that checks the changeover criteria. Owing to the use of the APLL, the delay DL illustrated in FIG. 6 is not needed here, because the changeover mode can be delayed by applying a later phase of the signal that was multiplied by four in frequency.

Figure 8:
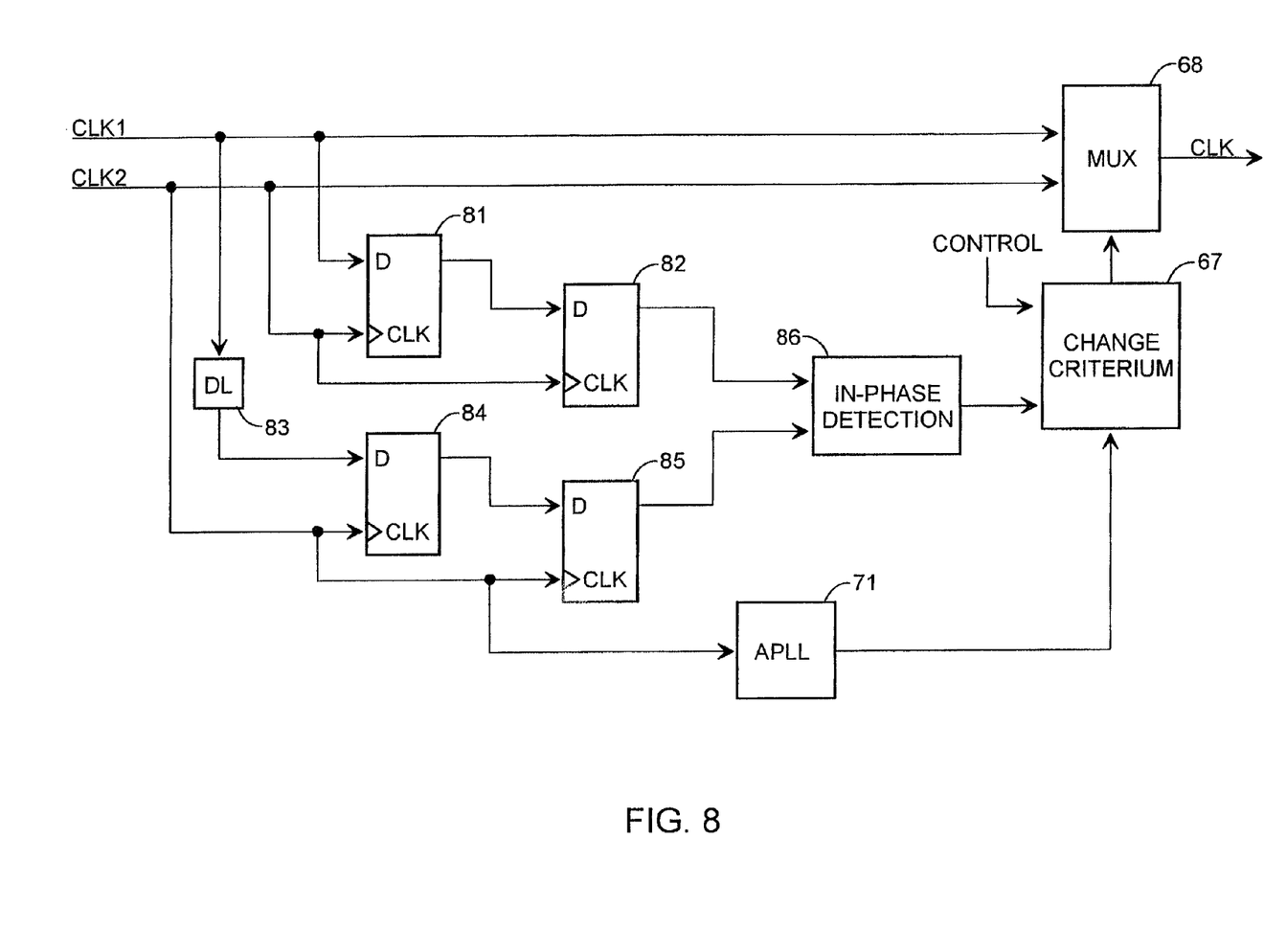
FIG. 8 is a block diagram illustrating a third clock signal multiplexer according to the invention.

The block 61 indicating the clock signal pattern "11" can be realised for example by an AND gate. The block 65 indicating the pattern "01" or "10" can be realised for instance by an XOR gate. The block 86 indicating the pattern "10" can be realised for example by an inverter plus an AND gate.

FIG. 8 illustrates a third clock signal changeover device according to the invention, wherein the phase difference between the signals is detected while the prevailing time difference is no longer than the delay DL. When the clock signal CLK1 is a little bit ahead of the clock signal CLK2, the output mode of the D-flip-flops 81, 82 is transmitted as one, but when the phase difference in any case causes a delay DL 83, the output mode of the D-flip-flops 84, 85 is transmitted as zero. Now the signals are considered to be sufficiently accurately cophasal, and the phase detector 86 obtains as input the output signals of the D-flip-flops 82, 85 in modes one and zero, and gives as output the signal one. The analog phase locked loop 71, the block 67 for checking the changeover criteria and the multiplexer 68 are otherwise operated in similar fashion as in the case of FIGS. 6 and 7, but the block 67 only takes into account the loop 71, the phase detector 86 and the control signals.

The respective elements in the above described drawings 6, 7 and 8 are referred to by the same numbers in order to better illustrate the situation.

Let us now observe an example of a propagation assured radio link according to the invention, where the applied error correction method is an RS (63, 59) algorithm.

With both transmission paths in the outdoor units OU1, OU2, there is calculated a check sum for a data flow of the length of the period under observation, by multiplying the data RS (63, 59) to be checked by a primitive polynome. The check sum is added as a continuation to the data to be checked. Here the period of observation is 354 bits, i.e. 59 bytes, when one byte includes 6 bits. The length of the data frame formed by the payload information contained by said period plus the check sum is 378 bits, i.e. 63 bytes, of which the share of the check sum is 4 bytes.

Here the created data frames are transmitted via two different radio paths, which are susceptible to disturbances in ways that are as different as possible. Thus possible interference generally causes errors only in one transmission path at a time.

The received data frames are treated in receiving outdoor units OU1, OU2 by dividing the transmitted data frame by a generator polynome, so that a divisional remainder is obtained. The algorithm that locates errors uses said remainder for detecting errors. In addition to error detection, errors can also be corrected, in this case no more than two erroneous bytes. The maximum amount of bytes that can be corrected can be raised, by means of interleaving, up to eight bytes. The bytes are corrected, and there is calculated an error sum that indicates how many errors the received data contained. In the outdoor units OU1, OU2 there is created a data frame that contains the corrected payload information and the error sum.

The indoor unit IU receives from both outdoor units OU1, OU2 a data frame, and the changeover device CD selects, on the basis of the error sum, a better transmission path for the payload information to be further conducted to the output cable.

The invention can be used for example for backing up the links in radio networks conforming to the plesiochronous digital hierarchy (PDH). In that case, for instance the frequencies of radio links in the GSM network fluctuate within the range 7–38 GHz, and even a reading as high as 58 GHz is possible. In this type of application, the payload signal is a data signal of the plesiochronous digital hierarchy (PDH), with a general velocity of 2 Mbit/s or an even multiple thereof, but it may also be at least 34 Mbit/s. The length of the link is something between a hundred meters up to as much as several tens of kilometers.

Here an active mode of the signal means that the signal criteria are fulfilled. Thus the signal mode is true or advantageously one. The signal modes can also be inverted, in which case instead of mode "11", there is observed mode "00". The term 'identical modes' refers, however, to modes "11" or "00", and 'un-identical modes' means modes "01" or "10".

The indoor unit and outdoor unit here refer to the symbolic position of the unit in the system, and it does not restrict the location of said unit in the interior or exterior of a building.

Then number of transmission paths can be two or more.

The invention is not restricted to the above described embodiments only, but many modifications are possible within the scope of the inventive idea defined in the appended claims.

The invention claimed is:

1. A method for selecting a clock signal from a plurality of parallel clock signals received from a plurality of parallel transmission paths in a digital data transmission, comprising the steps of:

receiving, at a unit comprising a changeover device, parallel clock signals from at least two parallel transmission paths, the parallel clock signals being generated from a single originating signal, a first clock signal of the parallel clock signals being designated the selected clock signal and being transmitted to an output of the unit;

requesting, by the changeover device, a change of the selected clock signal from the first clock signal to a second clock signal of the parallel clock signals based on an indication received from a phase locked loop of an unreliability in locking the first clock signal;

determining whether the first and second clock signals are both in a predetermined mode and determining whether a polarity of a signal phase difference of the first and second clock signals is inverted, thereby indicating the same phase or a phase shift of 180°;

generating a first signal when it is determined that the first and second clock signals are in the predetermined mode, initiating a time delay when it is determined that the polarity of the signal phase difference of the first and second clock signals is inverted, and generating a second signal after the time delay has elapsed; and changing the selected clock signal to the second clock signal in response to said step of requesting and when said first and second signals are present, whereby said step of changing occurs proximate a phase coincidence of the first and second clock signals.

2. The method of claim 1, wherein said step of requesting comprises requesting the changing of the selected clock signal using a control signal generated by the changeover device, the control signal being based on the indication of said unreliability of the locking of the first clock signal by said phase locked loop; and wherein said step of changing comprises regulating a multiplexer to change the clock signals when the control signal, the first signal, and the second signal are present.

3. A unit for digital data transmission and for changing parallel clock signals in the digital data transmission, comprising:

a changeover device including means for receiving parallel clock signals from at least two parallel data transmission paths, the parallel clock signals being generated from a single originating clock signal;

means for forwarding a selected one of the parallel clock signals to an output of the unit; and means for changing a selected clock signal from a first clock signal of the parallel clock signals to a second clock signal of the parallel clock signals based on an indication of unreliability of locking the selected clock signal;

means for detecting whether the first and second clock signals are in an identical mode and that a polarity of a signal phase difference is inverted;

wherein the change of the selected clock signal occurs after a delay to ensure that the changeover occurs while the clock signals are static.

4. The unit of claim 3, wherein said changeover device comprises an application specific integrated circuit including:

a clock signal multiplexer having means for determining when a suitable clock signal phase is present and means for performing the change of the selected clock signal when the suitable clock signal phase is present;

at least two data frame decoding blocks for respectively receiving the parallel clock signals and associated data signals from the at least two data transmission paths and forming decoded control signals and data signals therefrom;

at least two elastic buffer and control blocks receiving the decoded control signals and decoded data signals and forming data signals that are synchronized by the selected clock signal;

a data signal multiplexer selecting the data signal to be received; and a further decoding block synchronizing the received data signal using the selected clock signal into a final data signal and controlling the data signal multiplexer using a synchronizing signal generated by said at least two data frame decoding blocks.

5. The unit of claim 3, wherein the unit is part of a radio link in a mobile telecommunications system.

6. An arrangement for digital data transmission, comprising:

a first indoor unit for dividing a clock signal to be transmitted into parallel clock signals;

a second indoor unit for receiving the parallel clock signals, selecting one of the parallel clock signals as a selected clock signal, and transmitting the selected clock signal to an output of the second indoor unit;

a first changeover device in said first indoor unit and a second changeover device in said second indoor unit for receiving the parallel clock signals; and first and second outdoor units each provided with a transmitter for transmitting one of the parallel clock signals to be changed and respectively a receiver for receiving a parallel clock signal, and a phase locked loop synchronized with the selected clock signal, said second changeover device generating a request for changing the selected clock signal from a first clock signal to a second clock signal of the parallel clock signals based on an indication of an unreliability in locking the selected clock signal with the phase lock.

7. The arrangement of claim 6, wherein each of said first and second changeover devices is realized in an application specific integrated circuit which comprises:

a clock signal multiplexer having means for determining when a suitable clock signal phase is present and means for performing the changeover when the suitable clock signal phase is present;

at least two data frame decoding blocks for respectively receiving the parallel clock signals and associated data signals from the at least two data transmission paths and forming decoded control signals and data signals therefrom;

at least two elastic buffer and control blocks respectively receiving the decoded control signals and decoded data signals and forming data signals that are synchronized by the selected clock signal;

a data signal multiplexer selecting the data signal to be received; and a further decoding block synchronizing the received data signal using the selected clock signal into a final data signal and controlling the data signal multiplexer using a control signal generated by said at least two data frame decoding blocks.

8. The arrangement of claim 7, wherein the control signal includes a synchronizing signal, a bit error signal, a frame alignment alarm signal, and a pseudo frame signal.

9. The arrangement of claim 7, wherein said clock signal multiplexer comprises:
  a first block for detecting identical modes of the parallel clock signals, said first block generating an active signal when the parallel clock signals are in the same mode;
  D-flip-flop circuits forming a phase shift sensitive coupling;
  a second block for detecting un-identical modes of the clock signals connected to outputs of the phase shift sensitive coupling, an output of said second block being raised, in response to said phase shift sensitive coupling, to the value one after a period of one cycle of the second parallel clock signal has passed from the moment when the polarity of the phase difference between the parallel clock signals was changed;
  a delay circuit for delaying the output signal from said second block;
  a third block checking for the request for changing the selected clock signal, the output signal from the first block, and the delayed output signal from the second block; and
  a multiplexer for changing the selected clock signal from the first clock signal to the second clock signal under the control of said third block when the request for change, the output signal from the first block, and the delayed output signal from the second block are present at the third block.

10. A changeover device for selecting a clock signal from a plurality of parallel clock signals, comprising:
  means for receiving parallel clock signals from at least two data transmission paths, the parallel clock signals being generated from a single originating clock signal, and a selected clock signal from the parallel clock signals;
  means for receiving a control signal indicating an unreliability of locking the selected clock signal;
  change requirement means for determining a change in the selected clock signal is required from a first clock signal to a second clock signal in response to the control signal;
  same mode means for determining that the first and second clock signals are in the same mode;
  inversion means for determining an inversion of the polarity of a signal phase difference between the first and second clock signals indicating a situation, thereby indicating that the first and second signals were either in the same phase or in a phase shift of 180°; and
  control means for checking said change requirement means, said same mode means, and said inversion means, initiating a time delay when a requirement for a change is determined, the first and second clock signals are in the same mode, and the inversion is determined, and performing the changeover after the time delay is elapsed to ensure that the changeover is effected while the clock signals are in a static mode.

11. An application specific integrated circuit, comprising:
  means for receiving parallel clock signals from at least two data transmission paths, the parallel clock signals being generated from a signal originating clock signal, and a selected clock signal from the parallel clock signals;
  means for receiving a control signal indicating an unreliability of locking the selected clock signal;
  change requirement means for determining a change in the selected clock signal is required from a first clock signal to a second clock signal in response to the control signal;
  same mode means for determining that the first and second clock signals are in the same mode;
  inversion means for determining an inversion of the polarity of a signal phase difference between the first and second clock signals indicating a situation, thereby indicating that the first and second signals were either in the same phase or in a phase shift of 180°; and
  control means for checking said change requirement means, said same mode means, and said inversion means, initiating a time delay when a requirement for a change is determined, the first and second clock signals are in the same mode, and the inversion is determined, and performing the changeover after the time delay is elapsed to ensure that the changeover is effected while the clock signals are in a static mode.

12. A clock multiplexer, comprising:
  means for receiving first and second parallel clock signals from two data transmission paths, the first and second parallel clock signals being generated from a signal originating clock signal, said first parallel clock signal being a selected clock signal;
  a first block generating an active signal when the parallel clock signals are in the same mode;
  D-flip-flop circuits forming a phase shift sensitive coupling;
  a second block detecting un-identical modes of the clock signals connected to outputs of the phase shift sensitive coupling, an output of said second block being raised, in response to said phase shift sensitive coupling, to the value one after a period of one cycle of the second parallel clock signal has passed from a point in time when a polarity of a phase difference between the parallel clock signals was changed;
  a delay circuit for delaying the output signal from said second block;
  a third block checking for the request for changing the selected clock signal, the output signal from the first block, and the delayed output signal from the second block; and
  a multiplexer for changing the selected clock signal from the first clock signal to the second clock signal under the control of said third block when the request for change, the output signal from the first block, and the delayed output signal from the second block are present at the third block.

13. An application specific integrated circuit, comprising:
  means for receiving first and second parallel clock signals from two data transmission paths, the first and second parallel clock signals being generated from a signal originating clock signal, said first parallel clock signal being a selected clock signal;
  a first block generating an active signal when the parallel clock signals are in the same mode;
  D-flip-flop circuits forming a phase shift sensitive coupling;
  a second block detecting un-identical modes of the clock signals connected to outputs of the phase shift sensitive coupling, an output of said second block being raised, in response to said phase shift sensitive coupling, to the value one after a period of one cycle of the second parallel clock signal has passed from a point in time when a polarity of a phase difference between the parallel clock signals was changed;
  a delay circuit for delaying the output signal form said second block;

a third block checking for the request for changing the selected clock signal, the output signal from the first block, and the delayed output signal from the second block; and a multiplexer for changing the selected clock signal from the first clock signal to the second clock signal under the control of said third block when the request for change, the output signal from the first block, and the delayed output signal from the second block are present at the third block.

* * * * *